United States Patent
Lin

(10) Patent No.: US 9,851,507 B1
(45) Date of Patent: Dec. 26, 2017

(54) BROADBAND RESTRICTED MMI-BASED POLARIZATION BEAM SPLITTER

(71) Applicant: INPHI CORPORATION, Santa Clara, CA (US)

(72) Inventor: Jie Lin, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/671,905

(22) Filed: Aug. 8, 2017

Related U.S. Application Data

(63) Continuation of application No. 15/375,033, filed on Dec. 9, 2016, now Pat. No. 9,759,865, which is a continuation of application No. 15/147,803, filed on May 5, 2016, now Pat. No. 9,547,131.

(51) Int. Cl.
   *G02B 6/10* (2006.01)
   *G02B 6/27* (2006.01)

(52) U.S. Cl.
   CPC .......... *G02B 6/2773* (2013.01); *G02B 6/102* (2013.01); *G02B 6/105* (2013.01); *G02B 6/2726* (2013.01)

(58) Field of Classification Search
   None
   See application file for complete search history.

(56) References Cited

U.S. PATENT DOCUMENTS

| | | | | |
|---|---|---|---|---|
| 5,436,992 A * | 7/1995 | Wang | ...................... | G02B 6/126 385/14 |
| 5,475,771 A * | 12/1995 | Hosoi | ...................... | G02B 6/126 385/11 |
| 5,749,132 A * | 5/1998 | Mahapatra | ............. | G02B 6/126 204/192.18 |
| 5,838,842 A * | 11/1998 | Mackie | .............. | G02B 6/12007 359/486.02 |
| 5,852,691 A * | 12/1998 | Mackie | .............. | G02B 6/12007 385/14 |
| 7,035,494 B1 * | 4/2006 | Mackie | ................ | G02B 6/2813 385/129 |
| 7,734,122 B1 * | 6/2010 | Mackie | .............. | G02B 6/12007 385/14 |
| 9,366,818 B1 * | 6/2016 | Lin | ...................... | G02B 6/2773 |
| 2003/0108294 A1 * | 6/2003 | Zheng | ................ | G02B 6/12004 385/39 |

(Continued)

*Primary Examiner* — Jerry Rahll
(74) *Attorney, Agent, or Firm* — Richard T. Ogawa; Ogawa P.C.

(57) ABSTRACT

A compact polarization beam splitter is formed by cascading two stages of three restricted MMIs. Each MMI is configured to set ultra compact width and length for a rectangular waveguide body to limit no more than 4 modes therein working as a polarization beam splitter in a 50 nm wavelength window around 1300 nm. Each MMI is further configured to couple an input at a first end and a TE bar output and a TM cross output at a second end of the rectangular waveguide body. The locations of the input/output waveguide ports are designated to be a distance of ⅙ of the width away from a middle line from the first end to the second end. Two second-stage MMIs have their inputs coupled to the TE bar output and the TM cross output of the first-stage MMI and provide a second-stage TE bar output and a second-stage TM cross output, respectively.

13 Claims, 4 Drawing Sheets

$Di \sim 1/6W$
$Do_1 = Do_2 \sim 1/6W$

(56) References Cited

U.S. PATENT DOCUMENTS

| | | | |
|---|---|---|---|
| 2003/0219188 A1* | 11/2003 | Doi | G02B 6/2813 385/3 |
| 2012/0288229 A1* | 11/2012 | Doerr | G02B 6/12 385/29 |
| 2013/0142476 A1* | 6/2013 | Dallesasse | G02B 6/26 385/11 |
| 2013/0209112 A1* | 8/2013 | Witzens | G02B 6/2813 398/214 |
| 2015/0309252 A1* | 10/2015 | Kato | G02B 6/12 385/11 |

* cited by examiner

BROADBAND RESTRICTED MMI-BASED POLARIZATION BEAM SPLITTER

CROSS-REFERENCE TO RELATED APPLICATIONS

This application is a continuation of and claims priority to U.S. patent application Ser. No. 15/375,033, filed on Dec. 9, 2016 and priority to U.S. Pat. No. 9,547,131, issued on Jan. 17, 2017, commonly assigned and incorporated by reference herein for all purposes.

BACKGROUND OF THE INVENTION

The present invention relates to a broadband communication device. More particularly, the present invention provides a broadband restricted MMI-based polarization beam splitter with low loss and high extinction ratio for a broad wavelength band of 1270 nm-1330 nm.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

As an important integrated optics device, a compact polarization beam splitter (PBS) can be used to achieve polarization independent operation of photonic integrated circuits (PICs) and linear optical quantum information technology. PBS has become a key element for polarization management in next polarization-independent Si Photonics Circuit. A preferred PBS should simultaneously have short device length, high extinction ratios, low insertion loss, broadband operation, stability, simple structure and high fabrication tolerances. Compact, simple and broadband PBS on silicon-on-insulator (SOI) is crucial for Coarse Wavelength Division Multiplexing (CDWM) in the 1300 nm window. The state-of-art designs for the PBS are mostly based on asymmetrical Mach-Zehnder interferometer (MZI), single directional coupler. The conventional PBS has at least one or more the following issues of low in extinction ratio between orthogonal polarizations Transverse Magnetic (TM) mode and Transverse Electric (TE) mode, large in foot print, or wavelength-sensitive in 1300 nm window. Although immense amount of concrete researches have been done, the issues mentioned above remain to be unsolved.

Therefore, it is desired to develop improved compact polarization beam splitter that is wavelength insensitive across entire 1300 nm O-band window for the integrated Si photonics circuits.

BRIEF SUMMARY OF THE INVENTION

The present invention relates to photonic broadband communication device. More particularly, the present invention provides a broadband polarization beams splitter (PBS) with wavelength insensitive across entire O-band. Merely by example, the present invention discloses a compact PBS with two-stage cascaded MMIs formed by silicon nitride waveguide with high extinction ratio between orthogonal polarizations Transverse Magnetic (TM) mode and Transverse Electric (TE) mode and low insertion loss for integration in Si photonics circuits over a broad wavelength window of 1270 nm-1330 nm, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a polarization beam splitter for a broad wavelength window. The polarization beam splitter includes a waveguide body in rectangular shape with a width and a length configured to yield no more than four modes. Additionally, the polarization beam splitter includes an input waveguide being coupled to a first end of the waveguide body at a location having a first distance away from a middle line along the length. The polarization beam splitter further includes a pair of output waveguides being coupled to a second end of the waveguide body at two mirrored locations having a second distance away from the middle line. The length is selected to be 61.25 μm and the first distance is substantially the same as the second distance equal to ⅙ of the width, so as to provide an polarization beam splitting mechanism for splitting a light signal in a wavelength window of at least 50 nm around 1300 nm received at the input waveguide to a primarily TE polarization mode signal at one of the pair of output waveguide located at same side of the middle line and a primarily TM polarization mode signal at another one of the pair of output waveguide.

In an alternative embodiment, the present invention provides a compact polarization beam splitter (PBS) for a broad wavelength window around 1300 nm. The compact PBS includes a first birefringence waveguide device configured to receive a light signal at a first input port and split the light signal to a first TE polarization mode signal at a first bar output port and a first TM polarization mode signal at a first cross output port. The compact PBS further includes a second birefringence waveguide device having a second input port coupled to the first bar output port and at least a second bar output port for further passing a second TE polarization mode signal. Additionally, the compact PBS includes a third birefringence waveguide device having a third input port coupled to the first cross output port and at least a second cross output port for further passing a second TM polarization signal. Each of the second birefringence waveguide device and the third birefringence waveguide device is configured to be substantially the same as the first birefringence waveguide device. Each of them includes a waveguide body in rectangular shape with a width of 2 μm and a length of 61.25 μm configured to yield no more than four modes. Each of them further includes an input waveguide being coupled to a first end of the waveguide body at a location having a first distance away from a middle line along the length. Each of them additionally includes a pair of output waveguides being coupled to a second end of the waveguide body at two mirrored locations having a second distance away from the middle line. Within each of them, the first distance is substantially the same as the second distance equal to ⅙ of the width, so as to provide an polarization beam splitting mechanism for splitting a light signal in a wavelength window of at least 50 nm around 1300 nm received at the input waveguide to a primarily TE polarization mode signal at one of the pair of output waveguide located at a same side of the middle line and a primarily TM polarization mode signal at another one of the pair of output waveguide.

In another alternative embodiment, the present invention provides a method of manufacturing a compact polarization beam splitter for a broad wavelength window around 1300 nm. The method includes forming a first waveguide device comprising a rectangular body and an input port and a pair of output ports respectively located on two ends of the rectangular body at a fixed distance away from either side relative to a middle line of the rectangular body across the two ends. The rectangular body has a width and a length restricted for limiting no more than 4 modes therein and the fixed distance is set to ⅙ of the width. Additionally, the method includes forming a second waveguide device substantially the same as the first waveguide device. The input port of the second waveguide device is coupled to one of the pair of output ports aligned with the input port of the first waveguide device. Furthermore, the method includes forming a third waveguide device substantially the same as the first waveguide device. The input port of the third waveguide device is coupled to another one of the pair of output ports of the first waveguide device.

In a specific embodiment, the present invention provides a compact polarization beam splitter no more than 200 μm in length formed with planner waveguide in a single process on a same silicon-on-insulator substrate. In another specific embodiment, the present invention provides a broad band PBS with high-extinction ratio of greater than 20 dB that is insensitive to in a broad wavelength range from 1270 nm to 1330 nm.

Many benefits of polarization beam splitting can be achieved with the present invention based on the waveguide-based directional couplers. As an example, using silicon nitride (SiN) waveguide made by CMOS technology based on SOI wafer to replace typical Si waveguide provides a wider bandwidth with relaxed processing tolerance in selecting width or length. The SiN birefringence results different beat length between polarization TE mode and TM mode with improved polarization splitting extinction ratio (ER). With a narrow SiN-based MMI waveguide segment, it restricts the excitations with compact size and limited (no more than 4) modes resulted from mirrored and direct images only. The restrict MMI design of the compact PBS is characterized by its highly wavelength-insensitivity for wide wavelength window which optionally can be the whole C-band or majority of O-band depending on the configuration of the MMI design. Additionally, by cascading two stages of such MMI-based PBSs, an improved ER >20 dB can be achieved.

The present invention achieves these benefits and others in the context of known polarization beam splitting technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
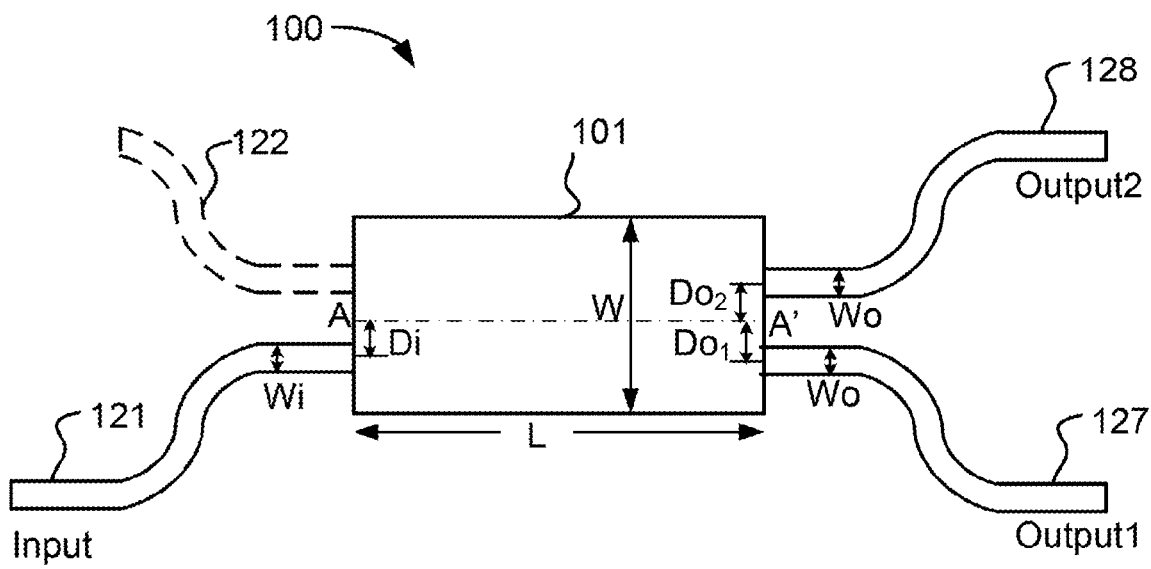
FIG. 1 is a simplified diagram of a restricted MMI waveguide-based polarization beam splitter according to an embodiment of the present invention.

The present invention relates to photonic broadband communication device. More particularly, the present invention provides a broadband polarization beams splitter (PBS) with wavelength insensitive across 1270 nm-1330 nm in O-band. Merely by example, the present invention discloses a compact PBS with two-stage cascaded MMIs formed by silicon nitride waveguide with high extinction ratio between orthogonal polarizations Transverse Magnetic (TM) mode and Transverse Electric (TE) mode and low insertion loss for integration in Si photonics circuits over a wavelength window of 1270 nm-1330 nm in O-band, though other applications are possible.

Integrated polarization beam splitter (PBS) is a key element for polarization management in next polarization-independent Si Photonics Circuit for applications in coherent optical communication systems, sensing, optical signal processing, planar lightwave circuits (PLC), and other areas. Compact, simple and broadband PBS on silicon-on-insulator (SOI) is crucial for Coarse Wavelength Division Multiplexing (CDWM) in the 1300 nm window. Majority of existing PBS designs based on asymmetrical Mach-Zehnder interferometer (MZI) or single directional couplers are not suitable for 1300 nm window applications, because the performance is wavelength sensitive. Silica PLC-based PBS is available for 1300 nm window with good ER but has very large foot print (~20 cm) and is not practical for Si Photonics Circuits. In principle, waveguide-based polarization splitting is achieved by utilizing the modal birefringence inherent in optical waveguides. In the following sections, multimode interferometer (MMI) based polarization beam splitter (PBS) with restricted modes is explored by utilizing silicon nitride birefringence for realizing different beat lengths for TE and TM modes for 50 nm broad band application. Particularly, the MMI PBS is expected to be high in extinction ratio of above 20 dB and insensitive to wavelengths of entire O-band from 1270 nm to 1330 nm.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of or "act of in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram of a restricted MMI waveguide-based polarization beam splitter according to an embodiment of the present invention. This diagram is merely an example, which should not unduly limit the scope of the claims. One of ordinary skill in the art would recognize many variations, alternatives, and modifications. As shown, a restricted MMI device 100 is formed with a planar waveguide with rectangular shaped body of a length L and width W. Two input waveguide ports, one being a real input port 121 and one dummy input 122, are coupled to one end of the length L of the rectangular shaped body of the MMI device 100. Two output waveguide ports, 127 and 128, are coupled to another end of the MMI device 100. The dummy input 122 optionally is eliminated so the MMI device has only one input port 121. Alternatively, the input port 121 can be a single input port disposed at the position of the dummy input 122 (thus without the dummy port).

In an embodiment, the MMI device including both the rectangular shaped body and all input/output waveguide ports are made by silicon nitride material on a SOI substrate. A layer of silicon nitride material on the SOI substrate is patterned and etched to create the waveguide structure as depicted in FIG. 1. In particular, the silicon nitride material is selected for utilizing its optical birefringence property to make this MMI device 100 a polarization beam splitter by providing different excitation beat lengths for the mirrored and direct images of propagating light intensities for TE polarization mode and TM polarization mode along the length direction of the rectangular body 100.

In the embodiment, the rectangular shaped waveguide body is configured to induce multimode self-imaging effect with certain orders of modes across the length L and within the width W. The length L and width W are selected with respective minimum values for forming the MMI device with limited number of modes. For example, as W=2 µm and L=61.75 µm are selected, an ultra-compact restricted MMI device with pseudo 2×2 input/output configuration as depicted in FIG. 1 is formed with restricted excitation and limited modes. In particular, by disposing each input or output waveguide port at a position that is a distance D=±W/6 away from a middle line AA' along the length direction and with the selection of minimum value W, only 4 modes (with second order coefficient becoming zero) are resulted in both mirrored and direct images of the propagating electro-magnetic field in the rectangular MMI waveguide body. The narrow MMI body width W results in TE and TM mode output at different paths spatially. The short MMI body length L makes the MMI device an ultra-compact PBS. The total length including both the rectangular shaped waveguide body and the input/output waveguide ports can be made to be less than 100 µm.

In addition, the input waveguide port is configured to have a reduced width of Wi ~0.7 µm and each output waveguide port is configured to have a reduced width of Wo ~0.5 µm. The input/output port configuration in association with the rectangular body provides optimum accommodations to both the mode restriction in association with the D value mentioned above and alignment with strongest propagating beats of TE mode and TM mode split thereof for achieving the highest extinction ratio. In other words, an input light bearing both TE and TM polarization modes passes through the restricted MMI device 100 and results in substantial splitting of the TE and TM modes respectively to the two output ports. For example, at the output port 127 (output1), TE mode signal is found to be dominant amount in terms of optical power $P_{TE}$ and TM mode signal is a minor amount with $P_{TM}$, while at the output 128 (output2), TM mode signal is found to have dominant amount of $P_{TM}$ and TE mode signal becomes a minor amount there with small $P_{TE}$. The polarization extinction ratio (PER), defined as $10 \log_{10}(P_{TE}/P_{TM})$, is a quantitative measure of relative amount of each mode in each output port. Higher PER value indicates high polarization splitting performance.

In an embodiment, the restricted MMI device 100 including associated input/output configurations as depicted in FIG. 1 acts as a polarization beam splitter (PBS). The output1 port 127 is substantially aligned with the input port 121 while the output2 port is disposed on the other side but an equal distance of the middle line AA'. As an optical signal is received at the input port 121, the output1 port 127 becomes a bar output port passing the TE mode signal with low loss and the output2 port 128 becomes a cross output port for passing the TM mode signal with low loss. At the same time, TM mode signal suffers big loss at bar port 127 and TE mode signal suffers big loss at cross port 128.

In addition, W=2 µm and L=61.75 µm for the silicon nitride based rectangular shaped MMI device is a preferred section for configuring the PBS for a broad band of wavelengths around 1300 nm. In a specific embodiment, the polarization split performance of the above silicon nitride based restricted MMI device is substantially wavelength-insensitive over entire O-band of ~50 nm between 1275 nm and 1325 nm. It is a crucial wavelength band for CWDM application. Optionally, other material(s), single-type or hybrid, with proper birefringence optical property can be used to form the MMI PBS device with some adjustment on the length L or other featured parameters, although the wavelength insensitivity characteristic across majority of O-band may also be affected. For example, all silicon based MMI can also be used for forming a polarization beams splitter. Optionally, by tuning the length L of the restricted MMI device, the polarization beam splitter can be optimized for working in a different wavelength window. For example, setting L=45 µm can in principle make a PBS having C-band as a preferred wavelength-insensitive working band. Of course, other feature parameters may be included or tuned in order to form a high-performance wavelength-insensitive PBS with high extinction ratio within entire C-band.

Figure 2:
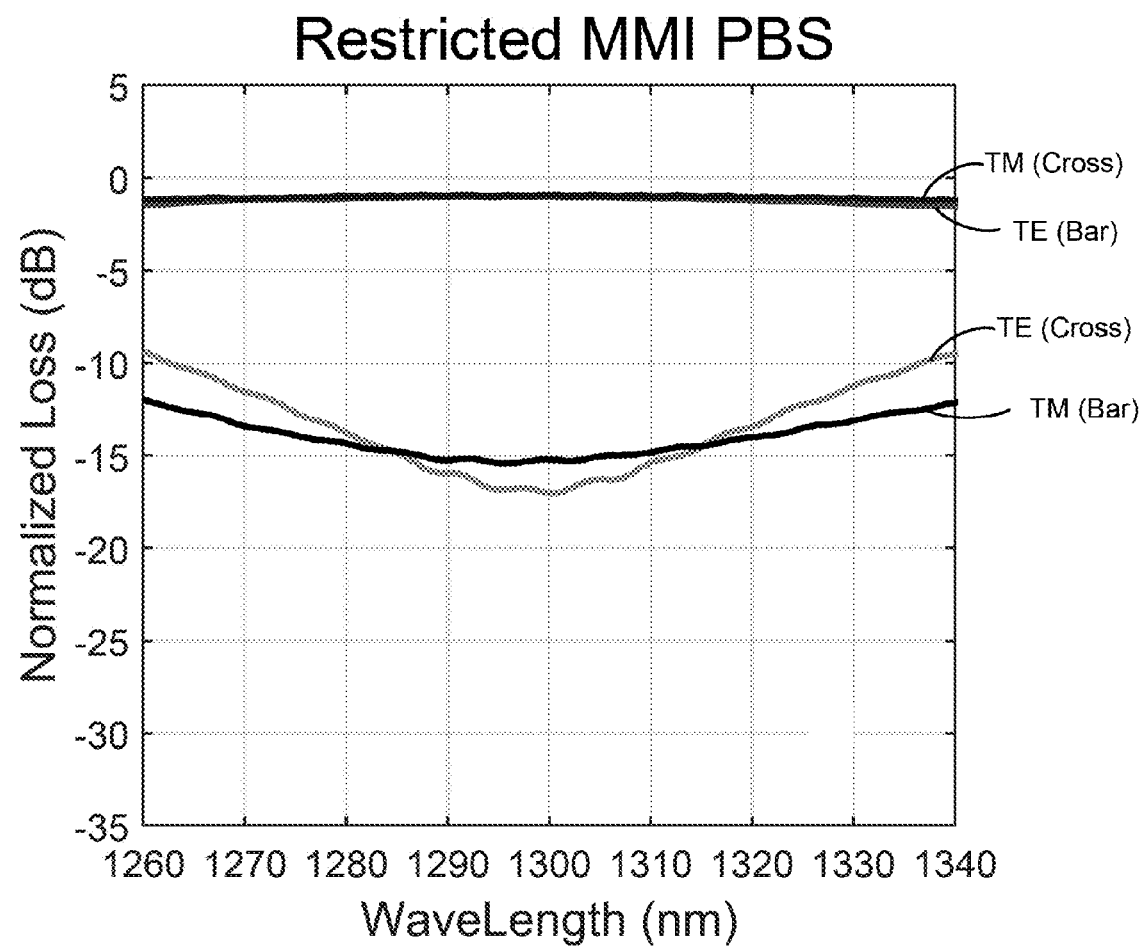
FIG. 2 is an exemplary plot of normalized transmission loss measured on a restricted MMI PBS of FIG. 1 according to an embodiment of the present invention.

FIG. 2 is an exemplary plot of normalized transmission loss measured on a restricted MMI PBS of FIG. 1 according to an embodiment of the present invention. This diagram is merely an example, which should not unduly limit the scope of the claims. One of ordinary skill in the art would recognize many variations, alternatives, and modifications. As shown, normalized transmission power losses of optical signal power at the output1 and output2 ports against the signal power received at the input port is plotted respectively for TE polarization mode and TM polarization mode against a wide range of wavelengths from 1260 nm to 1340 nm. The TM mode output power at the bar port (output1) has low loss of about 1 dB and so does the TE mode output power at the cross port (output2). At the same time, the TM mode output power suffers big loss (>10 dB) at the cross port and so does the TE mode output power at the bar port. As shown, the TM mode output at the bar port and TE mode output at the cross port are very insensitive to the wavelengths for entire band from 1260 nm to 1340 nm. The TE mode output at the bar port and the TM mode output at the cross port show a minor wavelength dependency in the same band. For example, the TE mode output at the bar port suffers greater than 15 dB power loss near 1300 nm but less than 10 dB power loss at 1260 nm or 1340 nm. The TM mode output at the cross port has slightly less wavelength sensitivity. Overall, the PBS based on the ultra-compact restricted MMI device 100 is characterized by a PER of at least 10 dB from entire O-band from 1270 nm to 1330 nm.

Figure 3:
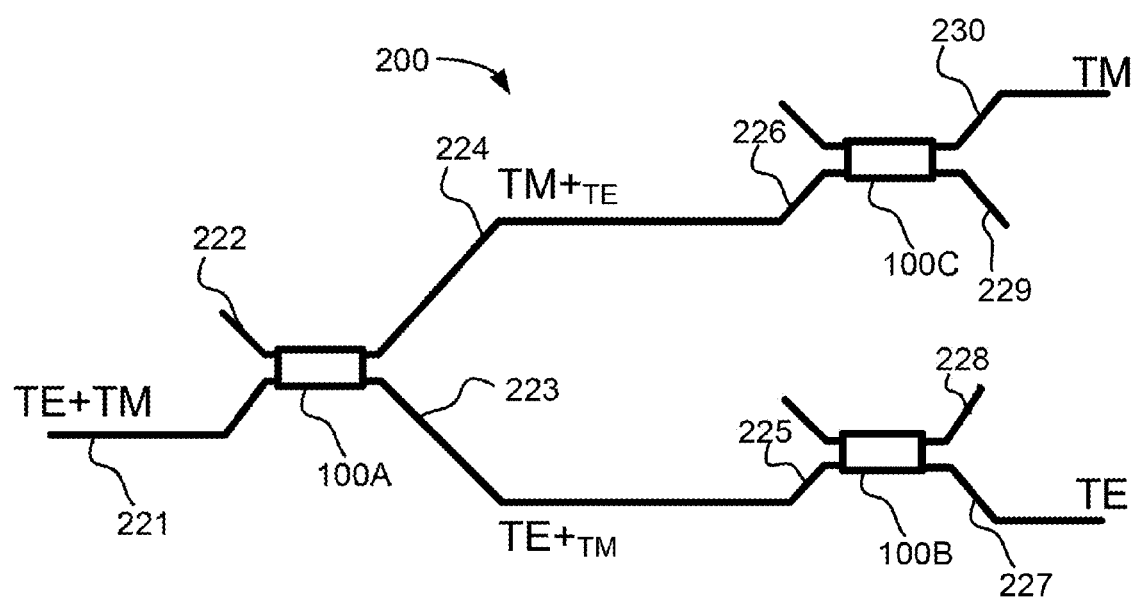
FIG. 3 is a simplified diagram of a two-stage cascaded polarization beam splitter (PBS) according to an embodiment of the present invention.

Bearing the advantage of ultra-compact size provided by the restricted MMI device as a broad-band polarization beam splitter, an improved mini-sized broad-band PBS with much enhanced extinction ratio can be obtained by cascading the restricted MMI devices. FIG. 3 is a simplified diagram of a two-stage cascaded polarization beam splitter (PBS) according to an embodiment of the present invention. This diagram is merely an example, which should not unduly limit the scope of the claims. One of ordinary skill in the art would recognize many variations, alternatives, and modifications. As shown, the PBS 200 is formed by cascading a single restricted MMI device 100A as a first-stage PBS with a pair of restricted MMI devices 100B and 100C, each as a second-stage PBS. Each of these restricted MMI devices is configured to be substantially the same as the MMI device 100 shown in FIG. 1.

In a specific embodiment, the first-stage PBS 100A is substantially the same as the restricted MMI device 100, having an input port 221 for receiving a light signal bearing mixed TE and TM polarization modes and a first bar output 223 and a first cross port 224. Referring to FIG. 1 for the restricted MMI device structure and FIG. 2 for its polarization beam splitting performance, the first bar output 223 is configured to output mainly the TE mode signal but having minor amount of TM mode signal with about 10 dB power loss. Similarly, the first cross output 224 is configured to output mainly the TM mode signal plus a minor TE mode signal with −10 dB power relative to the input light signal. Of course, the first-stage PBS 100A is a 2×2 MMI device with another input port 222 to have a preferred self-imaging distribution with limited modes. Typically the input port 222 is treated as a dummy port not in use or is simply terminated. The first-stage PBS 100A thus has just ~100 μm size and a PER of 10dB for entire O-band.

In addition, the second-stage PBS 100B or 100C is also a MMI device substantially similar to the MMI device of FIG. 1 or the same as the first-stage PBS 100A. In particular, the one second-stage PBS 100B has an input port 225 coupled to the first bar port 223 of the first-stage PBS for receiving only the output signal of major TE mode. The dummy input of the second-stage PBS is not used. The other second-stage PBS 100C has an input port 226 coupled to the first cross port 224 of the first-stage PBS 100B to receive only the output signal of major TM mode. Again, the dummy input of this second-stage PBS 100C is also not used.

Furthermore, the second-stage PBS 100B has a second bar port 227 (with a corresponding cross output port 228 not being used or terminated) configured to further output a TE mode signal with low loss where the TM mode signal amount is further reduced in power by another −10 dB or more. Similarly, the other second-stage PBS 100C has a second cross port 230 (with a corresponding bar output port 229 not being used or terminated) configured to further output a TM mode signal with low loss where the TE mode signal amount is further reduced in power by another −10 dB or more. Again, the MMI devices in both stages are configured for entire O-band (1300 nm band), giving the working wavelength band for the cascaded PBS 200 the same wavelength window. In an embodiment, the cascaded PBS 200 has the input port 221 for receiving an optical signal with mixed TE and TM polarization modes and is configured to split the optical signal with primarily TE mode being outputted to a bar output port 227 and primarily TM mode being outputted to a cross output port 230. The size of the cascaded PBS 200 is doubled to about 200 μm, which is still considered to be a compact size. But the PER of the cascaded PBS 200 between the bar/cross output port is increased also for entire O-band. Detailed measurement data of the PER for the 2-stage cascaded PBS based on the restricted MMI devices are shown below.

Figure 4:
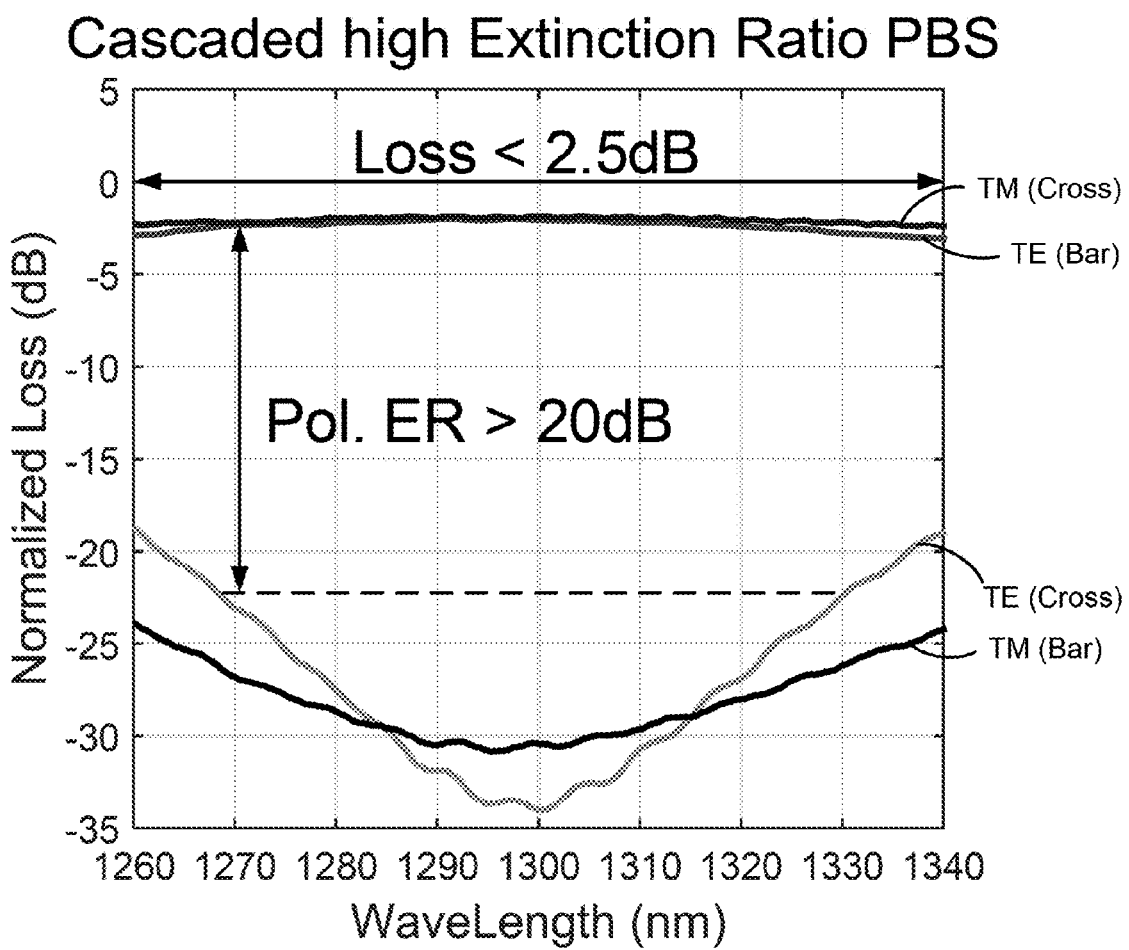
FIG. 4 is an exemplary plot of normalized transmission loss measured on a 2-stage cascaded PBS of FIG. 3 according to an embodiment of the present invention.

FIG. 4 is an exemplary plot of normalized transmission loss measured on a 2-stage cascaded PBS of FIG. 3 according to an embodiment of the present invention. This diagram is merely an example, which should not unduly limit the scope of the claims. One of ordinary skill in the art would recognize many variations, alternatives, and modifications. As shown, normalized transmission power losses of optical signal power at the bar output port and cross output port against the signal power received at the input port is plotted respectively for TE polarization mode and TM polarization mode against a wide range of wavelengths from 1260 nm to 1340 nm. Due to the two-stage cascading structure, the optical signal transmission loss will take account of both stages of the MMI devices. Note, TM mode output power at the cross output port has a loss still less than 2.5 dB in a ~50 nm window from 1275 nm to 1325 nm. Similarly, TE mode output power at the bar output port also has a transmission loss <2.5 dB in that same window. At the same time, TE mode output power suffers bigger loss (>20 dB) at the cross output port over the same 50 nm window and so does TM mode output power at the bar output port, giving an enhanced PER value of 20 dB or higher for the cascaded PBS 200.

As shown, the primary TE mode output at the bar output port and primary TM mode output at the cross output port of the cascaded PBS are substantially wavelength-insensitive for entire O-band from 1270 nm to 1330 nm. The polarization beam splitting performance is superior near the center wavelength 1330 nm with a PER value of about 30 dB. For a small window from 1290 nm to 1310 nm, PER value is at least greater than 29 dB. For a bigger window from 1280 nm to 1320 nm, PER is still greater than 27 dB. For entire O-band from 1270 nm to 1330 nm, PER is at least greater than 20 dB. Therefore, the cascaded PBS has more than doubled PER value with a trade-off of doubling its size compared to a single restricted MMI PBS.

In an alternative embodiment, the present invention also provides a method for forming a compact broad-band polarization beam splitter for O-band from 1270 nm to 1330 nm. The method includes providing a silicon-on-insulator (SOI) substrate and patterning silicon layer of the SOI substrate. Also, the method may include forming an insulator layer overlying the patterned silicon layer and forming a silicon nitride layer overlying the insulator layer. Then, the method includes patterning the silicon nitride layer for forming entire waveguides/ports structure for two stages of restricted MMI devices in a seamless single series of process on the same SOI substrate. The method includes making a first-stage restricted MMI device configured to be a polarization beam splitter for O-band. This includes patterning a silicon nitride layer over a SOI substrate to form a rectangular waveguide body having a width W and a length L, and to form at least one input waveguide port coupled to an end of the rectangular waveguide body at a distance D away from a middle line of the rectangular waveguide body along the length direction, and to form two first-stage output waveguide ports respectively coupled to the rectangular waveguide body from another end at the displace D away from both side of the middle line. All the rectangular waveguide body and the first-stage input/output waveguide ports are made by the same silicon nitride material or other suitable material with birefringence optical properties.

The method further includes setting the width W and length L respectively to their optimum values in association with the silicon nitride waveguide material to provide (particularly via the width W) limited modes for the mirrored and directed image of electro-magnetic field of a propagating light signal received from the input waveguide port. Particularly, the length L contributes a working wavelength window over 50 nm around 1300 nm in which the polarization beam splitting performance with high extinction ratio is substantially wavelength insensitive.

Additionally, the method includes setting the distance D of the first-stage input/output waveguide ports to a position such that $D=\pm W/6$ to ensure that there is no more than 4 modes in the waveguide body. This means, if W=2 μm, the center point of each of the first-stage input/output waveguide ports is just 0.33 μm. Therefore, the output waveguide must be made narrow too. In an embodiment, silicon nitride base first-stage input waveguide port has a width about 0.7 μm and each silicon nitride second-stage output waveguide port has a width of 0.5 μm to allow a little gap existing between the two first-stage output waveguide ports (such as output1 and output2 ports of FIG. 1).

Furthermore, the method also includes forming a pair of second-stage restricted MMI devices in substantially the same way (with a same material and a substantially the same geometrical patterns, dimensions, and input/output port locations to provide a same direct/mirror imaging mode distribution in waveguide body) to be configured each as a polarization beam splitter (PBS) and together with the first-stage restricted MMI device on a same SOI substrate. Moreover, the method includes a step of cascading the pair of second-stage PBS to the first-stage restricted MMI device-based PBS. In particular, a first one of the pair of second-stage PBS is patterned on the SOI substrate such that its second-stage input waveguide port is connected to one first-stage output waveguide port (bar port) that is substantially for passing a light signal with primarily TE polarization mode associated with a first PER value. Thus, the first second-stage PBS is further configured to perform polarization beam splitting for passing substantially primary TE mode out to its bar port, i.e., a second-stage output waveguide port, with a final enhanced PER value. But the other second-stage output port of the first one second-stage PBS is not used or terminated. At the same time, the second one of the pair of second-stage PBS is patterned on the SOI substrate such that its second-stage input waveguide port is connected to another first-stage output waveguide port (cross port) that is substantially for passing a light signal with primarily TM polarization mode associated with the first PER value. Thus, the second second-stage PBS is further configured to perform as a polarization beam splitting for passing substantially primary TM mode out to its cross port, i.e., a second-stage output waveguide port, with the final enhanced PER value (relative to the output at the first second-stage PBS). But the other second-stage output port of the second one second-stage PBS is not used or terminated. The process of cascading the two stages PBS is a seamless single process of forming three integrated silicon nitride waveguides each configured to be a restricted MMI device on a single SOI wafer.

Because of each second-stage PBS is made substantially the same as the first-stage PBS, all based on restricted MMI device design in silicon nitride, the polarization beam splitting performance would be also substantially the same over the optimum working wavelength window over 50 nm around 1300 nm while making the final enhanced PER value at least double or even greater within the same wavelength-insensitive window around 1300 nm.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A polarization beam splitter for a broad wavelength window comprising:
   a waveguide body in rectangular shape with a width and a length configured to yield no more than four modes;
   an input waveguide being coupled to a first end of the waveguide body at a location having a first distance away from a middle line along the length;
   a pair of output waveguides being coupled to a second end of the waveguide body at two mirrored locations having a second distance away from the middle line;
   wherein the first distance is substantially the same as the second distance equal to ⅙ of the width, so as to provide an polarization beam splitting mechanism for splitting a light signal in a broad band received at the input waveguide to a primarily TE polarization mode signal at one of the pair of output waveguide located at a same side of the middle line and a primarily TM polarization mode signal at another one of the pair of output waveguide.

2. The polarization beam splitter of claim 1, wherein the waveguide body is silicon nitride material formed on a silicon-on-insulator (SOI) substrate and configured to be a restricted multimode interference device for treating the light signal in the broad band from 1270 nm to 1330 nm.

3. The polarization beam splitter of claim 2, wherein the input waveguide and the pair of output waveguides are silicon nitride material formed on the same SOI substrate in a single patterning process.

4. The polarization beam splitter of claim 2, wherein the width of the waveguide body is selected to be 2 μm and the length of the waveguide body is selected to be 61.25 μm in association with the silicon nitride material being used.

5. The polarization beam splitter of claim 3, wherein the input waveguide has a width of 0.7 µm or smaller.

6. The polarization beam splitter of claim 3, wherein each output waveguide has a width of 0.5 µm or smaller.

7. The polarization beam splitter of claim 2, wherein one of the pair of output waveguide carrying the primarily TM/TE polarization mode signal comprises 1.5 dB or less in transmission loss for the TM/TE mode signal but at least 10 dB or greater in transmission loss for TE/TM polarization mode signal split from a same input light signal over the broad band from 1270 nm to 1330 nm received from the input waveguide.

8. The polarization beam splitter of claim 1, wherein the waveguide body and both the input waveguide and the pair of output waveguides are silicon material formed on a same SOI substrate with the length of the waveguide body being selected to be 45 mm for a wavelength window across C-band.

9. A compact polarization beam splitter for a broad wavelength window comprising:
 a first birefringence waveguide device configured to receive a light signal at a first input port and split the light signal to a first TE polarization mode signal at a first bar output port and a first TM polarization mode signal at a first cross output port;
 a second birefringence waveguide device having a second input port coupled to the first bar output port and at least a second bar output port for further passing a second TE polarization mode signal;
 a third birefringence waveguide device having a third input port coupled to the first cross output port and at least a second cross output port for further passing a second TM polarization signal;
 wherein each of the second birefringence waveguide device and the third birefringence waveguide device is configured to be substantially the same as the first birefringence waveguide device comprising:
  a waveguide body in rectangular shape configured to yield no more than four modes;
  an input waveguide being coupled to a first end of the waveguide body at a location having a first distance away from a middle line along the length;
  a pair of output waveguides being coupled to a second end of the waveguide body at two mirrored locations having a second distance away from the middle line;
 wherein the first distance is substantially the same as the second distance equal to ⅙ of the width, so as to provide a polarization beam splitting mechanism for splitting a light signal in a broad wavelength window received at the input waveguide to a primarily TE polarization mode signal at one of the pair of output waveguide located at same side of the middle line and a primarily TM polarization mode signal at another one of the pair of output waveguide.

10. The compact polarization beam splitter of claim 9 wherein each of the first, second, and third birefringence waveguide devices comprises a restricted multimode interference device having a total length less than 100 µm from the input waveguide to the output waveguide including its rectangular waveguide body.

11. The compact polarization beam splitter of claim 9 wherein the each of the first, second, and third birefringence waveguide devices comprises patterned planar waveguides made by silicon nitride material overlying a single silicon-on-insulator (SOI) substrate.

12. The compact polarization beam splitter of claim 9 wherein the first TM/TE polarization mode signal at the first bar/cross output port is associated with a transmission loss of less than 1.5 dB relative to the light signal at the first input port and a minor TE/TM polarization mode signal with extinction ratio greater than 10 dB over the broad wavelength window from 1270 nm to 1330 nm.

13. The compact polarization beam splitter of claim 9 wherein the second TM/TE polarization mode signal at the second bar/cross output port is associated with a transmission loss of less than 2.5 dB relative to the light signal at the first input port and a minor TE/TM polarization mode signal with extinction ratio greater than 20 dB over the broad wavelength window from 1270 nm to 1330 nm.

\* \* \* \* \*